United States Patent [19]

Ichihara

[11] Patent Number: 4,890,178
[45] Date of Patent: Dec. 26, 1989

[54] MAGNETIC BIAS COIL FOR A MAGNETO-OPTICAL RECORDING APPARATUS

[75] Inventor: Junichi Ichihara, Yokohama, Japan

[73] Assignee: Fujitsu Limited, Kawasaki, Japan

[21] Appl. No.: 176,275

[22] Filed: Mar. 31, 1988

[30] Foreign Application Priority Data

Apr. 10, 1987 [JP] Japan .................................. 62-55202

[51] Int. Cl.$^4$ .......................... G11B 5/127; G11B 7/00
[52] U.S. Cl. ......................................... 360/114; 369/13
[58] Field of Search ..................... 360/114, 59; 369/13

[56] References Cited

U.S. PATENT DOCUMENTS 4,803,674  2/1989  Nakao et al. ..................... 360/114

Primary Examiner—Vincent P. Canney
Attorney, Agent, or Firm—Staas & Halsey

[57] ABSTRACT

An electromagnetic bias coil for applying a magnetic bias field to a recording bit of a magneto-optical recording disk apparatus includes a yoke made of soft magnetic material, such as soft iron. The yoke surrounds an outer perimeter surface and a bottom surface of the coil. A light beam and optical system are arranged in an opening in the yoke. The yoke reduces the magnetic resistance of the coil, increases the magnetic field intensity at the recording bit, and reduces the current needed to achieve an adequate magnetic field intensity. The operating temperature of the coil is therefore improved.

3 Claims, 6 Drawing Sheets

MAGNETIC BIAS COIL FOR A MAGNETO-OPTICAL RECORDING APPARATUS

BACKGROUND OF THE INVENTION

This invention relates to an improved magnetic circuit for an electromagnetic bias coil used in a magneto-optical recording disk apparatus.

In an erasable magneto-optical recording disk apparatus, data that is recorded on a perpendicular magnetic anisotropic disk can be erased and data can be written thereon. In addition, data recording capacity of this apparatus is higher than that of the conventional magnetic data recording apparatus such as a magnetic disk. Because of their high storage capacity, magneto-optical recording disk apparatus have been the subject of extensive study and development.

A typical prior art erasable magneto-optical recording disk apparatus is schematically illustrated in FIG. 1, wherein parts having no relation to the explanation of the invention are not shown. In FIG. 1, numeral 1 denotes a recording media comprising a film of a perpendicular magnetic anisotropic material, such as TeFeCo (tellurium-iron-cobalt). A light 2 emitted from a semiconductor laser 2' is reflected by a beam splitter 3 and then focused by a lens system 4 onto a recording element 1-1 ("recording bit") in the recording media 1. A magnetic bias field is applied perpendicular to the recording media 1 by applying a current through an electromagnetic bias coil 5. The light beam 2 is radiated onto the recording bit until the recording bit is heated as high as approximately the Curie point of the material. At this temperature, the direction of the magnetic field in magnetic anisotropic material is oriented in the same direction as the applied magnetic bias field, in the area of the recording bit. This orientation of the recording bit's magnetic field remains when the recording bit is cooled after removing the light 2 therefrom.

In short, continuously radiating light onto the recording bit with a constant magnetic bias field applied thereto causes the recording media 1 be uniformly magnetized. Thus, previously recorded data can be erased. Writing data in an erased recording media 1 can be carried out as follows. The direction of the current applied to the electromagnetic coil 5 is reverse from that used during erase, and maintained. In other words, the magnetic bias field is reversed. Then, the light source 2' illuminates the desired recording bit. This heats the recording bit, permitting its magnetization direction to be changed.

Reading data stored in the recording bit can be carried out as follows. The light beam 2, which must be weak enough not to permit erasure of the recorded data during the reading process, illuminates a recording bit to be read out. No magnetic field is applied at this time. The polarization angle of the light reflected from the recording bit varies depending on the direction of its magnetization. This phenomena is known as a Kerr effect. Accordingly, detecting the polarization of the reflected light allows detection of the recorded digital data.

The light source 2', the optical system 4 for focusing the light and the coil 5 are installed on a carriage 6 that is movable in order to roughly trace a track of the disk. A tracking servo mechanism is included in the optical system (e.g. 2, 2', 3, 4 and 6) in order to precisely trace a particular track. This mechanism is not shown in order to simplify the figures.

FIG. 2 is a schematic, cross-sectional view of a configuration for a recording media (disk) 1, an optical system 4 and a bias coil 5 which does not have either a yoke or a core. The recording media 1 comprises a recording layer 11 including a perpendicular magnetic anisotropic material, and a protection layer 12 including a transparent material, such as glass. The optical system 4 comprises an outer cylinder 41 and a plurality of lenses 42. A laser light 21 emitted from the light source 2' is focused onto the recording bit 1-1 in the recording layer 11. The bias coil 5 can be a solenoid coil wound in a shape of cylinder, and must provide a magnetic field intensity of, for example, 300 Oe (Oersted) in a direction perpendicular to the recording layer 11.

FIG. 3 schematically illustrates a magnetic flux 8 provided by the bias coil 5. The protection layer 12 is typically as thick as 1.2 mm, and an air gap between the protection layer 12 and an end of the bias coil 5 is typically 1 mm so as to provide a margin for thermal deformation, etc. Because of these distances, a large current must be used in the coil in order to produce the required magnetic field intensity at the recording bit. However, large currents cause the temperature of coil 5 to rise. Such a temperature rise is a limitation of prior disk apparatus.

In order to avoid the temperature/current requirement problem, several structures have been proposed. For example, Tanaka in Japanese unexamined patent publication Sho 60-29904 discloses a magnetic core in the inner diameter of the coil (FIG. 5) and a yoke around the coil, with a magnetic core for the coil (FIG. 6).

Okada, in Japanese unexamined patent publication Sho 61-32244, and Shinbara in Japanese unexamined patent publication Sho 60-117403 propose using an additional magnetization device on the opposite side of the recording disk 1. However, such configurations block installation of the optical system. These configurations, therefore, do not allow both surfaces of a disk to be used in order to increase the recording capacity of a single disk.

The physical space that a coil and a yoke can occupy is limited by other peripheral devices. Typical dimensions of the space are: for example, 27 mm outer diameter; and 12 mm inner diameter (see, e.g., FIG. 4–6). Accordingly, the space occupied by the yoke or by the core reduces the space available for the coil. One way to reducing the size of the coil is to change the number of turns of the coil. This changes the electrical resistance of the coil, the magnetic field intensity at the recording bit, power consumption of the coil, and magnetic field intensity per power consumption. These parameters are shown in Table 1. The data is shown therein for the condition that the recording bit is located 2.2 mm from the coil's flat end facing the disk as represented in FIGS. 4–6.

It is usual to provide a recording layer on both surfaces of a disk in order to increase the recording capacity of the disk. The requires that two sets of coils such as shown in FIGS. 4, 5 or 6 and optical systems 4 in FIG. 1 be provided on opposing sides of the disk surface. Table 2 shows the number of turns of the coil, the electrical resistance of the coil, the magnetic field intensity at the recording bit, power consumption of the coil, and magnetic field intensity per consumption power for such a structure. FIGS. 8–10 respectively illustrate the magnetic field intensity generated when a constant current of 0.25 A is applied to the coils shown in FIGS. 4–6. In FIGS. 8–10, the horizontal axis represents a distance from the recording bit along the disk surface. In FIGS. 8–10, the solid lines relate to the left hand side scale and represent the magnetic field intensity of single coil; and the dotted lines relate to the right hand side scale and represent the magnetic field intensity of two coils together with the associated core and yoke, if any.

From FIGS. 9 and 10 respectively, it is seen that with the coil of FIG. 5 or 6 (where the magnetic core is provided along the inner diameter of the coil), the magnetic field intensity at the recording bit is less than the magnetic field intensity in a region of the disk surface above the core. The actual magnetic field intensity and the overall shape of the magnetic field distribution curve varies depending on the shape of the coil, the yoke, the thickness of the protection coating and the air gap. The coil parameters used to achieve the required 300 Oe by increasing coil current over that shown in Tables 1 and 2 are shown in Table 3 for a single coil and in Table 4 for two coils. From these tables, it is apparent that the magnetic field intensity at the recording bit cannot be easily increased without undesirable temperature increases in the coil.

SUMMARY OF THE INVENTION

It is an object of the invention to provide a magneto-optical recording disk apparatus having an enhanced magnetic field intensity at a recording bit of a magneto-optical recording disk.

It is another object of the invention to provide a magneto-optical recording disk apparatus with reduced heat dissipation in an electromagnetic bias coil. To achieve the above and other objects of the invention, a magneto-optical recording disk apparatus according to the invention includes a recording disk including a perpendicular magnetic anisotropic material; electromagnetic bias coil means having an outer perimeter surface and a bottom surface, for receiving a first current and for applying a first magnetic field to a region of the perpendicular magnetic anisotropic material, the first magnetic field being perpendicular to a surface of the recording disk; optical means, positioned coaxially with respect to the electromagnetic bias coil means, for receiving and focusing a light beam onto the region; and magnetic yoke means, comprising a soft magnetic material and positioned about the outer perimeter surface and the bottom surface for increasing the first magnetic field applied to the region in response to the first current.

The above-mentioned features and advantages of the present invention, together with other objects and advantages will be apparent and more fully described below with reference to the accompanying drawings. In the drawings, like numerals identify like parts.

DESCRIPTION OF THE PREFERRED EMBODIMENTS

Figure 12:
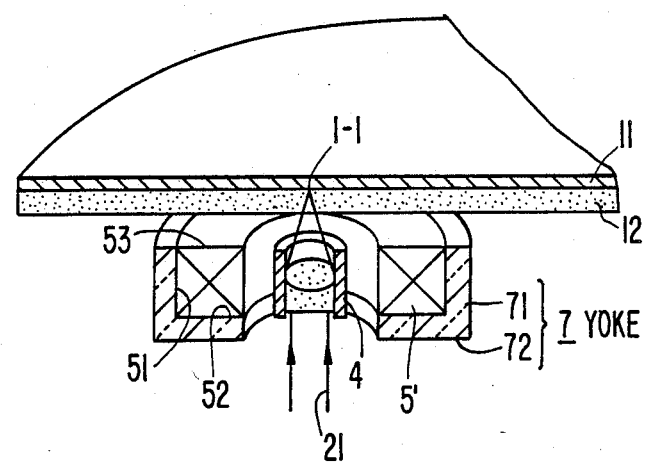
FIG. 12 schematically illustrates a cross-sectional view of a magneto-optical recording disk apparatus using the bias coil of FIG. 7.
Figure 4:
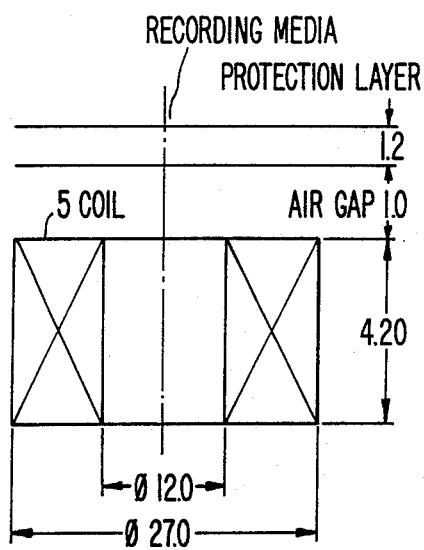
FIG. 4 schematically illustrates the structure and dimensions a prior art electromagnetic bias coil without a yoke.
Figure 5:
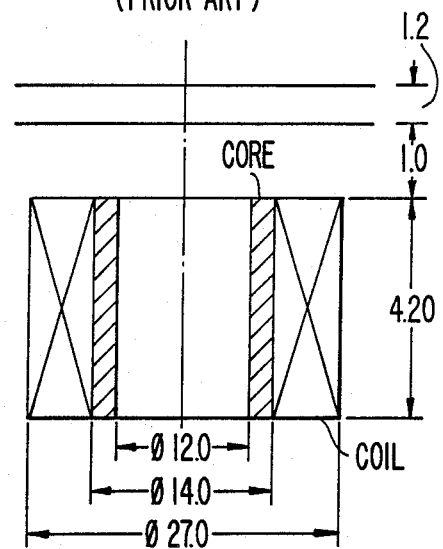
FIG. 5 schematically illustrates the structure and dimensions of a prior art electromagnetic bias coil with a magnetic core.
Figure 6:
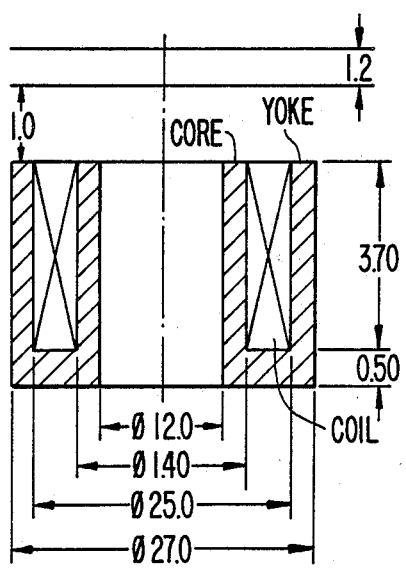
FIG. 6 schematically illustrates the structure and dimensions of a prior art electromagnetic bias coil with a magnetic yoke and core.
Figure 7:
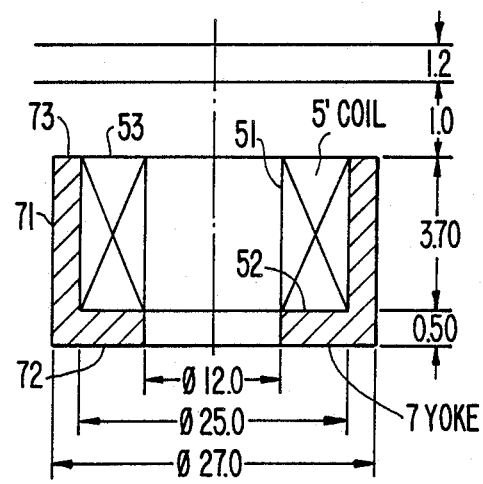
FIG. 7 schematically illustrates the structure and dimensions of an electromagnetic bias coil according to the present invention.
Figure 8:
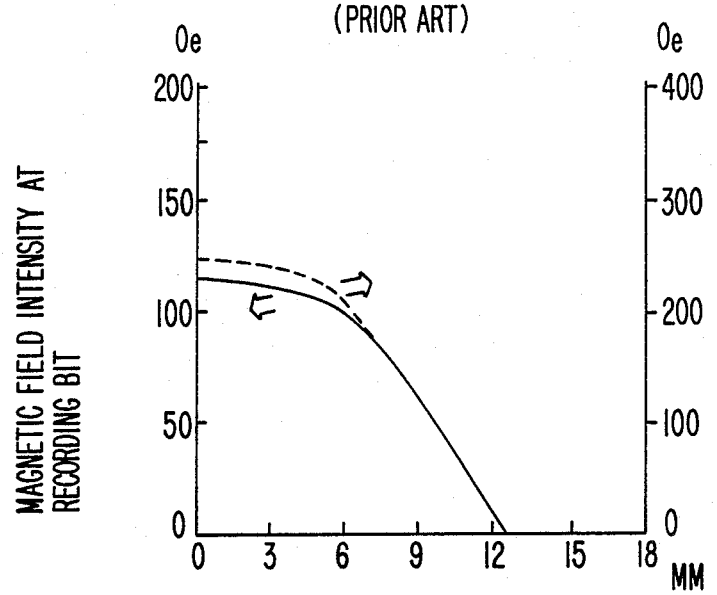
FIG. 8 shows the distribution of magnetic field intensity along the surface of a recording media for the electromagnetic bias coil of FIG. 4.
Figure 9:
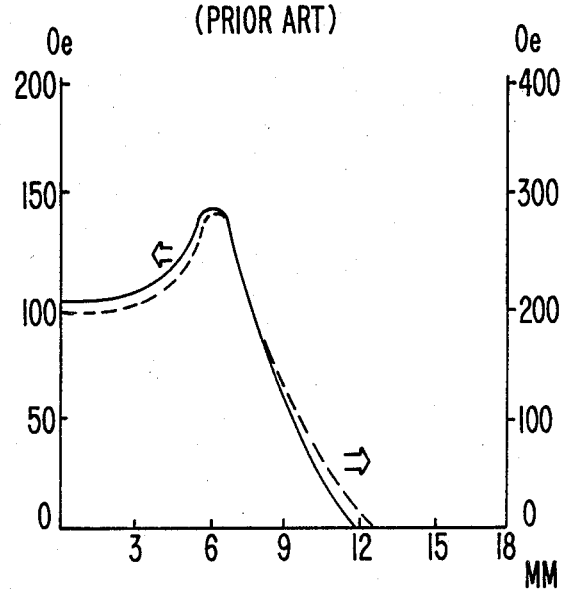
FIG. 9 shows the distribution of magnetic field intensity along the surface of a recording media for the electromagnetic bias coil of FIG. 5.
Figure 10:
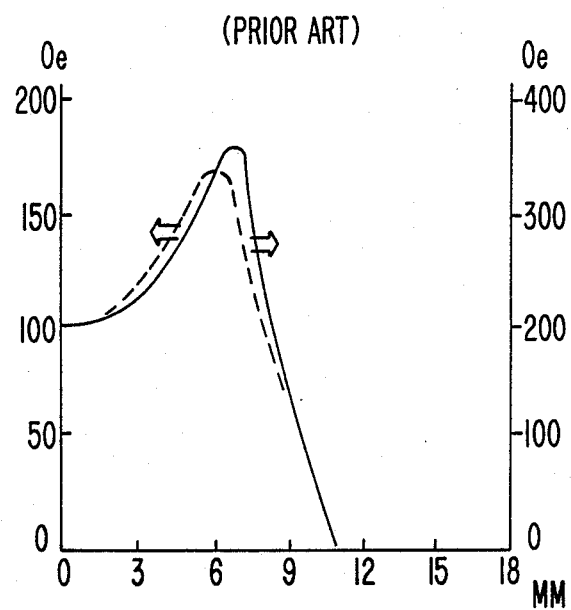
FIG.10 shows the distribution of magnetic field intensity along the surface of a recording media for the electromagnetic bias coil of FIG. 6.

FIG. 12 schematically illustrates a cross-sectional view of a magneto-optical recording disk apparatus using a bias coil according to the present invention, such as a bias coil illustrated in FIG. 7. An electromagnetic bias coil of the present invention includes a magnetic yoke 7 comprising soft iron. The yoke 7 includes a part 71 which surrounds the outer perimeter surface 51 of a coil 5′; and a part 72 which covers a bottom surface 52 i.e., the surface opposite the disk 1 of the coil 5′. The yoke part 72 has a hole formed in a central portion thereof. A light beam 21 passes through this hole and an optical system 4 can be positioned through this central hole. The soft magnetic material has a very large magnetic permeability and very little remnant magnetization. The permeability of soft iron can be as high as 1200. A soft ferrite or silicon steel can also be used for the yoke 7.

Figure 1:
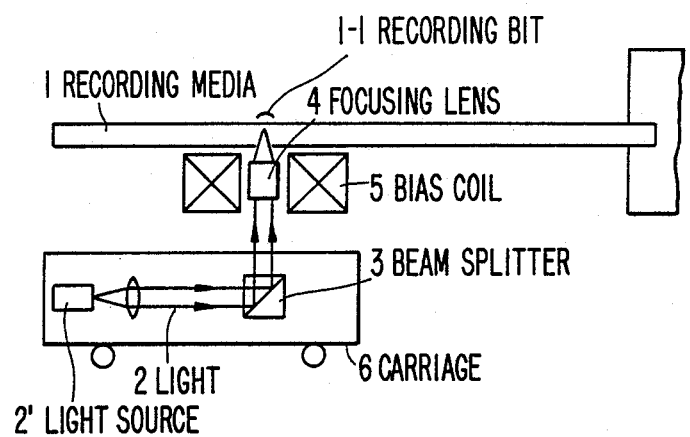
FIG. 1 schematically illustrates a configuration of a prior art magneto-optical recording disk apparatus.
Figure 2:
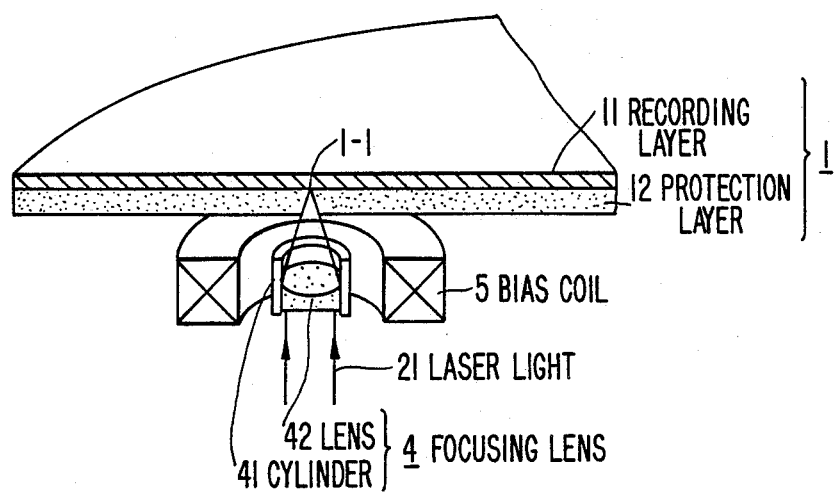
FIG. 2 schematically illustrates a cross-sectional view of a prior art optical system including an electromagnetic bias coil without either a yoke, or core.
Figure 3:
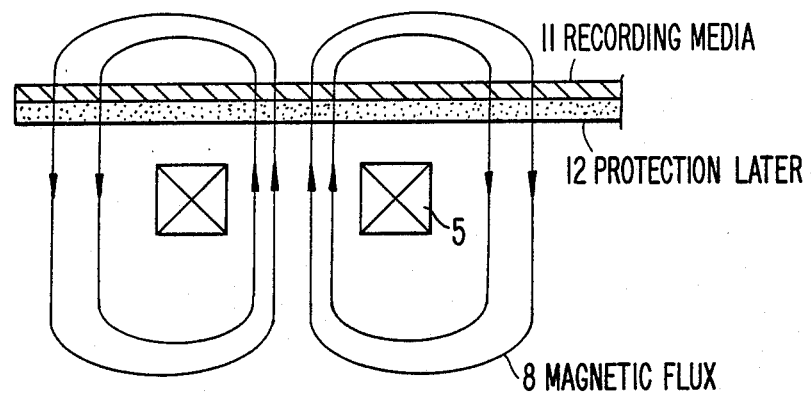
FIG. 3 schematically illustrates a magnetic flux about the electromagnetic bias coil of FIG. 2.
Figure 13:
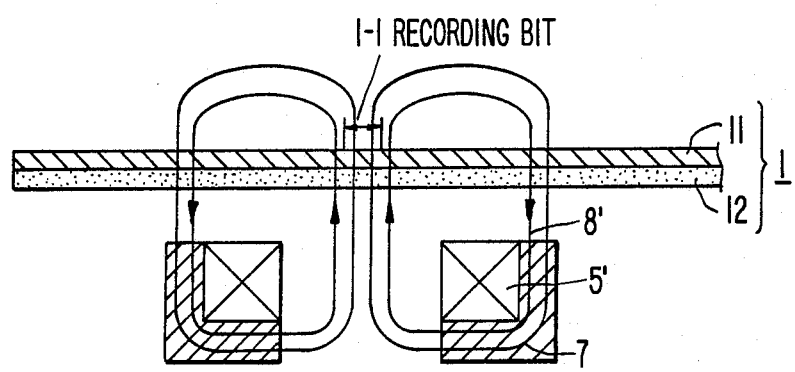
FIG. 13 schematically illustrates a magnetic flux about the electromagnetic bias coil of the present invention.
Figure 14:
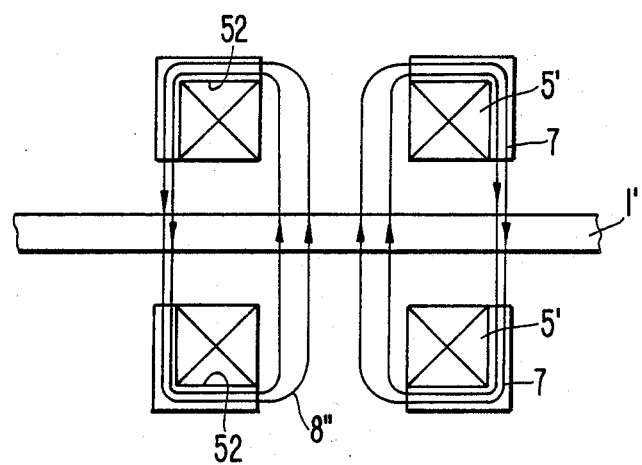
FIG. 14 schematically illustrates two electromagnetic bias coils positioned symmetrically with respect to the recording media, according to the present invention.

FIG. 13 schematically illustrates a magnetic flux about the electromagnetic bias coil of the present invention. Unlike the magnetic flux of the magnetic bias coil 5 shown in FIG. 3, the flux lines 8′ about the magnetic bias coil of the present invention flow through and are guided by the yoke 7. The yoke 7 guides the flux lines because the high permeability of the yoke material reduces the magnetic resistance of the magnetic circuit. The reduced magnetic resistance of the magnetic circuit excited by the coil 5′ therefore increases the magnetic flux flowing through the recording bit, and increases the magnetic field intensity at the recording bit. The coil 5′ with the yoke 7 can be symmetrically positioned with respect to the recording disk 1 as shown in FIG. 14. In FIG. 14, the magnetic flux lines are denoted with numeral 8″. The additional coil is used for recording and erasing recording bits on the two sides of the disk.

Figure 11:
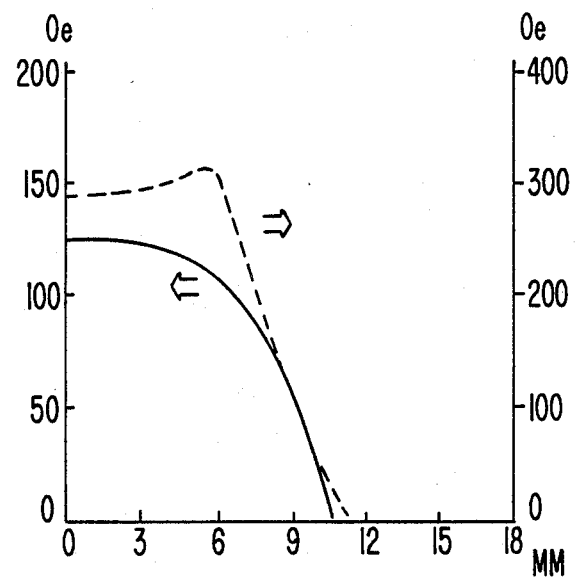
FIG. 11 shows the distribution of magnetic field intensity along the surface of a recording media for the electromagnetic bias coil of FIG. 7.

Distribution of the magnetic field intensity along the surface of the recording media 1 is shown in FIG. 11, where the solid line represents the magnetic field intensity of a single coil, and the dotted line represents the magnetic field intensity distribution curve for the symmetric two coils. The magnetic field intensity distribution curve for the two symmetric coils (the dotted line in FIG. 11) shows that there is a slight decrease in the magnetic field intensity in the region of the recording media near the recording bit. In other words, the peak magnetic field intensity is approximately at 6 mm from the recording bit measured along the recording media. Regardless of this, the bias coil of the present invention increases the magnetic field intensity at the recording bit over prior coils.

The beneficial effect of the bias coil of the present invention is shown in Tables 1 through 4 and in FIG. 11. The results of driving the prior art coils and the bias coil of the present invention with a constant current of 0.25 A, are shown in Table 1 for a single coil and shown in Table 2 for two coils symmetrically arranged with respect to the recording disk 1. The measurements show that the bias coil of the present invention provides the highest magnetic field intensity at the recording bit. However, the intensity is less than the abovedescribed minimum requirement 300 Oe when using a current of 0.25 A, even if two coils are used. Increasing the coil current does not change the shape of the magnetic field distribution curve, but only changes the height of the curve in proportion to the coil current. Table 3 shows the current need in each of the prior art coils and in the bias coil of the present invention to achieve the required 300 Oe. Table 4 illustrates the current required to achieve the required 300 Oe for two symmetric coils. From these tables, it is seen that the prior art coils require more than 10 percent more current than does the bias coil of the present invention. In addition, the prior bias coils consume more than 25 percent more power than does the coil of the present invention. Table 4 shows that the temperature rise for the coil of the present invention is approximately half that of the lowest temperature rise in the prior art coils.

The amount of power consumed by a coil is proportional to the square of the amount current flowing through the coil. Increases in the temperature of a coil increase the coil resistance, causing the coil to consume more power. As a result variations in the amount of current through a coil have a considerable impact on the operation of the coil. The coil current reduction achievable with the coil of the present invention provides a significant improvement in the performance of a coil.

Referring to FIG. 7, a flat end 73 of the yoke part 71 is coplanar with a flat end 53 of the coil 5'. These ends do not have to be coplanar in order to achieve a desirable flux distribution. Similarly, in FIG. 7 the diameter of the opening in the yoke portion 72 is the same as the inner diameter of the coil 5'. These diameters do not have to be equal in order to achieve a desirable flux distribution.

While the preferred embodiment has been explained with respect to specific coil sizes, the present invention is not limited to these particular coil sizes, and can be applied to coils of other sizes. In addition, while the required magnetic field intensity has been discussed as being 300 Oe in the preferred embodiment, other recording media can be used which require a magnetic field intensity of, for example, 150 Oe. In such a case, two coils would not be required. The yoke of the present invention functions both as a guide for magnetic flux, and as a magnetic shield to prevent magnetic interference with the bias coil 5 that is generated by the system for focusing and servo tracking the optical heads.

While the present invention has been discussed with respect to particular embodiments, the present invention is not limited to these particular embodiments. Instead, the present invention is defined by the appended claims.

I claim:

1. A magneto-optical apparatus for recording data on a recording disk including a perpendicular magnetic anisotropic material comprising:

electromagnetic bias coil means having an outer perimeter surface and a bottom surface, for receiving a first current and for applying a first magnetic field to a region of said perpendicular magnetic anisotropic material, said first magnetic field being perpendicular to a surface of said recording disk;

optical means, positioned essentially coaxially with respect to said electromagnetic bias coil means, for receiving and focusing a light beam onto said region; and magnetic yoke means, having an L-shaped cross-section and comprising a soft magnetic material and positioned about said outer perimeter surface and said bottom surface, for increasing the first magnetic field applied to said region in response to said first current.

2. An apparatus according to claim 1, wherein said soft magnetic material is chosen from a group consisting of: soft iron, silicon steel and soft ferrite.

3. A magneto-optical apparatus for recording data on a recording disk including a perpendicular magnetic anisotropic material comprising:

electromagnetic bias coil means positioned on a first side of the disk and having an outer perimeter surface and a bottom surface, for receiving a first current and for applying a first magnetic field to a region of said perpendicular magnetic anisotropic material, said first magnetic field being perpendicular to a surface of said recording disk;

optical means, positioned essentially coaxially with respect to said electromagnetic bias coil means, for receiving and focusing a light beam onto said region;

magnetic yoke means, positioned on the first side of the disk and comprising a soft magnetic material chosen from a group consisting of soft iron, silicon steel and soft ferrite and being positioned about said outer perimeter surface and said bottom surface, for increasing the first magnetic field applied to said region in response to said first current;

additional electromagnetic bias coil means, positioned on a second side of said recording disk opposite said first side, having an outer perimeter surface and a bottom surface, for receiving a second current and for applying a second magnetic field to said region of perpendicular magnetic anisotropic material, said second magnetic field being perpendicular to the surface of said recording disk; and another yoke means, comprising said soft magnetic material and positioned about said outer perimeter surface and said bottom surface of said another electromagnetic bias coil means.

* * * * *